United States Patent [19]

Edmonds, Jr. et al.

[11] Patent Number: 4,808,694
[45] Date of Patent: Feb. 28, 1989

[54] POLY(ARYLENE SULFIDE SULFONE) POLYMER CONTAINING ETHER GROUPS

[75] Inventors: James T. Edmonds, Jr.; Jon Geibel; Rex L. Bobsein, all of Bartlesville; Jim J. Straw, Nowata, all of Okla.

[73] Assignee: Phillips Petroleum Company, Bartlesville, Okla.

[21] Appl. No.: 168,111

[22] Filed: Mar. 14, 1988

[51] Int. Cl.$^4$ .................. C08G 23/00; H05K 1/03; C08L 81/04
[52] U.S. Cl. .................. 528/125; 528/126; 528/174
[58] Field of Search ............ 528/125, 126, 174

[56] References Cited

U.S. PATENT DOCUMENTS

| | | | |
|---|---|---|---|
| 3,354,129 | 11/1967 | Edmonds et al. | 260/79 |
| 3,400,065 | 9/1968 | Barth | 204/159.2 |
| 3,432,468 | 3/1969 | Gabler | 260/47 |
| 3,634,355 | 1/1972 | Barr | 260/49 |
| 3,655,822 | 4/1972 | McGrath et al. | 260/857 TW |
| 3,657,385 | 4/1972 | Matzner et al. | 260/857 R |
| 3,809,682 | 5/1974 | Studinka et al. | 260/61 |
| 3,919,177 | 11/1975 | Campbell | 260/79.1 |
| 4,016,145 | 4/1977 | Campbell | 260/79.3 M |
| 4,108,837 | 9/1978 | Johnson et al. | 528/126 |
| 4,125,525 | 11/1978 | Campbell | 528/388 |
| 4,127,713 | 11/1978 | Campbell | 528/391 |
| 4,175,175 | 11/1979 | Johnson et al. | 528/125 |
| 4,268,647 | 5/1981 | Keeley | 525/474 |
| 4,301,274 | 11/1981 | Campbell | 528/388 |
| 4,654,410 | 3/1987 | Kashiwame et al. | 528/171 |

FOREIGN PATENT DOCUMENTS

| | | |
|---|---|---|
| 0185317 | 6/1986 | European Pat. Off. |
| 0210377 | 2/1987 | European Pat. Off. |
| 0237593 | 9/1987 | European Pat. Off. |
| 1909441 | 11/1969 | Fed. Rep. of Germany |
| 3614602 | 11/1987 | Fed. Rep. of Germany |
| 3714583 | 11/1987 | Fed. Rep. of Germany |
| 2331584 | 6/1977 | France |
| 1078234 | 9/1967 | United Kingdom |
| 1264900 | 2/1972 | United Kingdom |

OTHER PUBLICATIONS

"Polyethersulfones", Encyclopedia of Chem. Technology, 3rd Ed., vol. 18, pp. 605-610, 613-615, (1982).
"Polysulfone", Modern Plastics Encyclopedia, pp. 98 and 102, (1972-1973), Walton, R. K.
Johnson et al., "Poly(arylethers) by Nucleophilic Aromatic Substitution: I. Synthesis and Properties", J. Polym. Sci. A-1,5, 7375-81, (1967).
Korshak et al., "Synthesis & Properties of Block Copolymers of Poly-Condensation Type", Makromol. Chem. Suppl., 6, 55-75, (1984).
Storozhuk et al., "Effect of Hydrogen Bonding in Formation of Poly(arylenesulfone Oxides)", Vysokanol. Soldin, Ser. A, 19(8), 1800-6, (1977), (CA: 87:118919v).

Primary Examiner—Harold D. Anderson
Assistant Examiner—T. Mason
Attorney, Agent, or Firm—Williams, Phillips & Umphlett

[57] ABSTRACT

A two-step process to make a poly(arylene sulfide sulfone) polymer exhibiting improved high temperature properties is described. In the first step a prepolymer characterized as dihalo-terminated polyethersulfone oligomers is prepared by reacting an aromatic diphenol with an excess of a dihalo aromatic sulfone. In the second step the excess dihalo aromatic sulfone and the oligomers are copolymerized in the presence of a sulfur source to form a poly(arylene sulfide sulfone) polymer. An alkali metal carboxylate is present in the second step. The polymers exhibit improved softening temperature and glass transition temperature and are useful in high temperature applications.

27 Claims, No Drawings

POLY(ARYLENE SULFIDE SULFONE) POLYMER CONTAINING ETHER GROUPS

FIELD OF INVENTION

This invention relates to poly(arylene sulfone), PASS. In another of its aspects this invention relates to a process for the production of poly(arylene sulfide sulfone). In accordance with a further aspect this invention relates to a two step process for the production of p-phenylene sulfide sulfone polymers.

BACKGROUND OF THE INVENTION

A wide variety of high polymers have been prepared from aromatic compounds, many of which are currently produced and marketed on a moderate to large scale. While such polymers are useful in many areas, one property of high polymers, particularly those of the thermoplastic type, which needs to be improved is the ability to withstand high use temperatures. Thermoplastic high polymers frequently form a continuous matrix for reinforcing agents and fillers which are added to alter the properties of the polymers before they are shaped into useful articles such as electrical and automotive parts. High polymers that will withstand high use temperatures alone or in combination with other ingredients are desirable.

High polymers used in elevated temperature applications include sulfur-containing aromatic polymers such as among others polyethersulfones, poly(arylene sulfide ketone)s, poly(arylene sulfide sulfone)s, and poly(arylene sulfide)s. Polyethersulfones, as well as those structurally similar polymers referred to as polysulfones and polyarylsulfones, contain both aryl ether and aryl sulfone linkages in the polymer backbone. These sulfur-containing aromatic polymers, generally, are prepared by a condensation reaction of about equimolar amounts of a dihalo aromatic compound with an aromatic diphenol and/or a sulfur source. A sulfone or ketone functionality usually is introduced into the polymer backbone by selection of the dihalo aromatic compound from a bis(haloaryl)sulfone or a bis(haloaryl)ketone, respectively.

Poly(arylene sulfide) polymers can be prepared by processes such as described in U.S. Pat. No. 3,354,129 and U.S. Pat. No. 3,919,177. Poly(arylene sulfide) polymers prepared according to the process of U.S. Pat. No. 3,354,129 can be air-cured to achieve desired properties. Alternately, higher molecular weight poly(arylene sulfide) polymers can be prepared by the process of U.S. Pat. No. 3,919,177. Basically, these two processes involve the reaction of a dihalo aromatic compound with a sulfur source under condensation conditions to form the poly(arylene sulfide) polymers. Reaction conditions including the addition of promoters and comonomers are adjusted to yield the desired polymers.

Poly(arylene sulfide sulfone) polymers can be prepared by processes such as described in U.S. Pat. No. 4,016,145 to yield polymers with a glass transition temperature in the range from 203° to 219° C. and a polymer melting temperature, PMT, in the range from 271° to 275° C. U.S. Pat. No. 4,127,713 describes a process to form high molecular weight aromatic sulfide/sulfone polymer.

Polyethersulfone polymers can be prepared by processes such as described in U.S. Pat. No. 3,655,822 and U.S. Pat. No. 4,108,837. U.S. Pat. No. 3,655,822 describes the preparation of chlorine-terminated polysulfone resins having molecular weights of about 2,000 to 45,000 by reacting less than about 4 mole percent excess of a dihalo aromatic compound with a dihydric phenol, also referred to as an aromatic diphenol herein. U.S. Pat. No. 4,108,837 describes one- and two-step processes for the preparation of higher molecular weight polyethersulfone polymers by reacting substantially equimolar amounts of a dihalobenzenoid compound with a dihydric phenol. The influence of a connecting link variation in the dihydric phenol on the glass transition temperature, $T_g$, of polyethersulfones formed by these latter processes is disclosed by Johnson et al in *Journal of Polymer Science;* A-1, 5, 2375-2398 (1967). The presence of thioether (or sulfide) link in the dihydric phenol lowers polymer $T_g$ as compared to the presence of a methylene link. Polyethersulfones aged at elevated temperatures below $T_g$ are essentially stable for long periods of time. Polymers having even higher $T_g$ are desirable in many useful articles.

Accordingly, an object of this invention is to provide a process for producing poly(arylene sulfide sulfone) polymers exhibiting good high temperature properties. It is a further objective of this invention to provide a process employing aromatic diphenols for the preparation of poly(arylene sulfide sulfone) polymers suitable for melt shaping useful articles.

SUMMARY OF INVENTION

An aromatic diphenol is reacted with a molar excess of dihalo aromatic sulfone in the presence of an inorganic base in an organic amide solvent. The reaction system is subsequently reacted with a sulfur source to give a poly(arylene ether sulfide sulfone) polymer, which contains aromatic, ether, sulfide and sulfone groups. This polymer can be characterized as a poly(arylene sulfide sulfone), PASS. The reaction can be carried out stepwise or in a continuous system.

In accordance with this invention a poly(arylene sulfide sulfone) polymer containing an ether link in the polymer backbone can be prepared in a two-step process. In a first step a prepolymer comprising essentially dihalo-terminated polyethersulfone oligomers can be prepared by reacting an aromatic diphenol with a substantial excess of a dihalo aromatic sulfone, in the presence of an alkali metal base, optionally, in the presence of an alkali metal carboxylate. Subsequently, in a second step a sulfur source, an alkali metal carboxylate and water are added to the reaction mixture to continue a polymerization reaction resulting in a modified poly(arylene sulfide sulfone) polymer of improved glass transition temperature and softening temperature.

In a first step of the present invention, a molar excess of at least one dihalo aromatic sulfone such as a bis(halophenyl)sulfone, at least one aromatic diphenol selected from the group consisting of a bis(hydroxyphenyl)alkane, bis(hydroxyphenyl)sulfide, bis(hydroxyphenyl)sulfone, dihydroxybenzophenone, and dihydroxyarylenes where arylene can be phenylene, naphthylene, or biphenylene, an organic amide such as a N-methyl-2-pyrrolidone, and, optionally, an alkali metal carboxylate, such as sodium acetate, can be reacted in the absence of a sulfur source, to yield a prepolymer. The prepolymer is linear and retains the ring substitution positions found in the reactants. The prepolymers comprise polyethersulfone oligomers that are dihalo-terminated, i.e. a chlorine atom is attached at least to each end of the linear oligomers.

In a second step of this invention, the linear oligomers can be reacted further, also under condensation conditions, in the presence of a sulfur source for a period of time sufficient to form an irregular poly(arylene sulfide sulfone) polymer of high softening point temperature.

As used herein a polymer whose molecules cannot be described by only one species of constitutional repeating unit in a single sequential arrangement is referred to as an irregular polymer. The polymers produced by our process include aromatic (arylene), sulfide, sulfone and ether groups in the backbone. These groups can be alternating in any sequence and in sequences such that blocks of a constitutional repeating unit are present.

Dihalo aromatic sulfones that can be employed in the process of the invention are bis(halophenyl)sulfones, presently preferred is bis(p-chlorophenyl)sulfone, optionally having each phenyl ring substituted with one to four R groups, each R individually and independently selected from the group consisting of hydrogen and alkyl groups having 1 to about 4 carbon atoms, the total number of carbon atoms in each molecule being within the range of 12 to about 44.

Examples of some bis(halophenyl) sulfones that can be employed in the process of this invention include bis(p-chlorophenyl)sulfone, bis(fluorophenyl)sulfone, bis(p-bromophenyl)sulfone, bis(iodophenyl)-sulfone, bis(2-methyl-4-chlorophenyl)sulfone, bis(2,5-dimethyl-4-chlorophenyl)sulfone, p-chlorophenyl p-bromophenyl sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, and the like, and mixtures thereof.

One type of aromatic diphenol that can be employed in the process of the invention is bis(alkylhydroxyphenyl) derivatives having the generalized structure

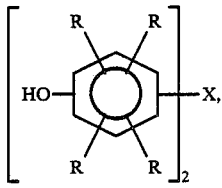

where X is —S—, —SO—, —SO$_2$—, —O—, a bond or an alkylene radical, each R individually and independently is selected from the group consisting of hydrogen and alkyl groups having 1 to about 4 carbon atoms. Examples of such aromatic diphenols, where X is —S— or —SO$_2$— includes bis(4-hydroxyphenyl)sulfide (Bisphenol T), and bis(4-hydroxyphenyl)sulfone (Bisphenol S).

When X is an alkylene radical, the aromatic diphenols are bis(alkylhydroxyphenyl) alkanes (1) which are characterized by having an alkylene radical link between two phenolic groups

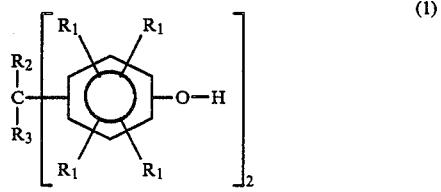

(1)

where each R$_1$ individually and independently is selected from the group consisting of hydrogen and alkyl groups having 1 to about 4 carbon atoms, and each R$_2$ and R$_3$ individually and independently is selected from the group consisting of hydrogen and alkyl groups having 1 to about 11 carbon atoms being subject to the proviso that sum of the carbon atoms represented by R$_2$ plus R$_3$ be less than 12 carbon atoms, and subject to the further proviso that the sum of carbon atoms in R$_1$, R$_2$, and R$_3$ groups not exceed 43, the total number of carbon atoms in each molecule being within the range of 13 to about 55.

Examples of some aromatic diphenols having the structure (1) that can be employed in the process of this invention include among others: bis(4-hydroxyphenyl)-methane, bis(2-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(3-methyl-4-hydroxyphenyl)propane, 2,2-bis(2-isopropyl-4-hydroxyphenyl)propane, 2,2-bis(3-butyl-4-hydroxyphenyl) propane, and the like, and mixtures thereof. Preferred is 2,2-bis(4-hydroxyphenyl)propane, commonly known as Bisphenol A.

Examples of other types of aromatic diphenols include hydroquinone(s), biphenol(s), dihydroxynaphthalene(s), bis(hydroxyphenyl)ketone(s), dihydroxyphenylphenylketone(s), dihydroxyfluorenone(s) and alkyl and aryl ring-substituted derivatives thereof.

Sulfur sources that can be employed in the process of this invention include hydrogen sulfide, alkali metal hydrosulfides such as sodium hydrosulfide, potassium hydrosulfide, alkali metal sulfides such as sodium sulfide or potassium sulfide, and mixtures thereof. Additional sulfur sources include among others those cited in U.S. Pat. No. 3,919,177 such as the acyclic and cyclic thioamides exemplified by N-methyl-2-pyrrolidinethione.

Alkali metal bases that can be employed in the process of this invention include lithium hydroxide, sodium hydroxide, potassium hydroxide, rubidium hydroxide, cesium hydroxide, lithium carbonate, sodium carbonate, potassium carbonate and mixtures thereof. In a preferred embodiment an alkali metal hydroxide is added in the first step as an about 50 weight percent aqueous solution and in the second step as the anhydrous solid. Even more preferred is sodium carbonate, which is added in the first step in an amount required for both steps.

Alkali metal carboxylates that can be employed in the process of this invention can be represented by the formula R'COOM, where R' is a hydrocarbyl radical selected from alkyl, cycloalkyl, and aryl, and combinations thereof such as alkaryl, aralkyl, and the like, the number of carbon atoms in R' being within the range of 1 to about 20, and M is an alkali metal selected from the group consisting of lithium, sodium, potassium, rubidium and cesium. Preferably, R' is an alkyl radical having 1 to about 6 carbon atoms or a phenyl radical, and M is sodium. If desired, the alkali metal carboxylate can be employed as a hydrate or as a solution or dispersion in a liquid. In a preferred embodiment the alkali metal carboxylate is added as the anhydrous salt.

Examples of some alkali metal carboxylates that can be employed in the process of this invention include lithium acetate, sodium acetate, potassium acetate, lithium propionate, sodium propionate, rubidium butyrate, lithium valerate, sodium valerate, cesium hexanoate, lithium cyclohexane carboxylate, potassium benzoate, sodium benzoate, lithium benzoate, and the like, and mixtures thereof. Sodium acetate is preferred.

The organic amides that can be used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, epsilon-caprolactam, dimethylbenzamide and the like, and mixtures thereof. N-Methyl-2-pyrrolidone (NMP) is preferred.

Substitute compounds for the organic amide include 1,3-dimethyl-2-imidazolidinone, dimethylsulfoxide, sulfolane, tetramethylurea, and hexamethylphosphoramide and mixtures thereof with an organic amide such as exemplified in the preceeding paragraph.

The preferred poly(arylene sulfide sulfone) polymers produced by the process of this invention can be characterized as irregular polymers, the molecules of which cannot be described by only one species of constitutional unit in a single sequential arrangement. The irregular polymers can be characterized as having at least constitutional units of (a) —(thio-1,4-phenylenesulfonyl-1,4-phenylene)—, illustrated in formula (2)

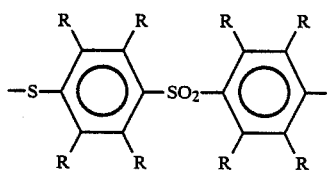

where each R individually and independently, can be selected from the group consisting of hydrogen and alkyl groups having 1 to about 4 carbon atoms, the total number of carbon atoms in each constitutional unit represented by (2) being within 12 to about 44, and (b) —(oxy-1,4-phenylene-alkylene-1,4-phenyleneoxy-1,4-phenylenesulfonyl-1,4-phenylenethio)— illustrated by formula (3)

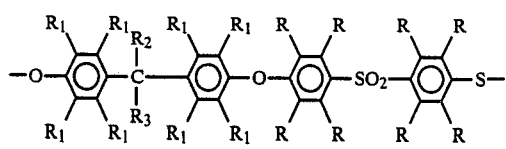

where $R_1$, $R_2$, and $R_3$ can be defined as in formula (1) and where R can be defined as in formula (2) above, and wherein constituental units (b) are randomly dispersed among sequences of variable length of constituental units (a).

A wide variety of reaction conditions can be employed in the practice of the invention. Similarly, any proportions of reactants which will react with each other to produce the irregular polymers of the invention are within the scope of the invention.

In the first step of the inventive process the aromatic diphenol is reacted with an excess of the dihalo aromatic sulfone, the excess conveniently being expressed as the ratio: moles dihalo aromatic sulfone/moles aromatic diphenol. This mole ratio can vary from about 1000/1 to about 1.001/1 as a broad range, from about 100/1 to about 1.01/1 as an intermediate range, and as a narrow range from about 20/1 to about 4/1.

In the first step of the preferred inventive process, for example, the mole ratio of reactants can be chosen such that the dihalo-terminated polyethersulfone oligomers formed are characterized as predominately comprising the oligomer resulting from the reaction of two moles of the dihalo aromatic sulfone with one mole of aromatic diphenol.

Such oligomers are achieved by conducting the reaction at a mole ratio of dihalo aromatic sulfone to aromatic diphenol within the range of about 8/1 to about 20/1 in the first step. The mole ratio of alkali metal base to aromatic diphenol can vary but generally will be within the range of about 2/1 to about 25/1, preferably about 10/1 to about 20/1. The amount of organic amide can vary greatly, generally being within the range of about 5 moles to about 15 moles per mole of the dihalo aromatic sulfone, preferably about 6 to about 10 moles. When the optional alkali metal carboxylate is added in the first step, the mole ratio of alkali metal carboxylate to dihalo aromatic sulfone can vary over a wide range but generally will be within the range of about 0.5/1 to about 3/1, preferably about 1/1 to about 2/1.

In the second step of the inventive process, the amount of sulfur source added is chosen such that the ratio: (moles of dihalo aromatic sulfone minus the moles of aromatic diphenol)/moles sulfur source, can be within the range of about 2/1 to about 0.8/1, preferably about 1.25/1 to about 0.9/1, and most preferably about 1.05/1 to about 0.95/1. The mole ratio of alkali metal base to sulfur source added in the second step can be within the range of about 1/1 to about 2.5/1, preferably about 1.1/1 to about 2.2/1. When the alkali metal carboxylate is added totally in the second step, the mole ratio of alkali metal carboxylate to dihalo aromatic sulfone charged can vary over a wide range, but generally will be within the range of about 0.5/1 to 3/1, preferably about 1/1 to 2/1.

An organic amide or substitute compound is used as a transfer medium during the addition of sulfur source and alkali metal carboxylate. Water is also added to bring the total water, including water of hydration, present in the polymerization system to an amount of at least about 3.5 moles water per mole of sulfur source and an amount greater than about 0.5 moles per mole of organic amide or substitute compound. Water of hydration can be contained in the sulfur source and the alkali metal base and must be taken into account.

When N-methyl-2-pyrrolidone is used, the NMP and water are added in amounts such that the ratio: (moles total water including water of hydration)/(moles total NMP) is greater than about 0.5, preferably in the range from about 0.75 to about 2.5, and even more preferred to the range from about 1 to about 2.

It is to be understood that the process of our invention can be carried out by mixing the dihalo aromatic sulfone, the aromatic diphenol, the alkali metal base, the organic amide and, optionally, the alkali metal carboxylate in any order in a first process step. Then, in a second process step the sulfur source, the alkali metal carboxylate and, if required the remaining quantity of the alkali metal base and organic amide. The alkali metal carboxylate must be added in this step, when it is not present in the first step.

Although the temperature at which reaction in a first process step is conducted can vary over a considerable range, generally it is within the range of about 150° to about 250° C., preferably about 160° to about 225° C., and most preferably about 175° to about 200° C. The reaction temperature in a second process step generally is within the range of about 175° to about 235° C., preferably about 190° to about 215° C., and most preferably about 195° to about 205° C.

The reaction time of each of the two process steps can vary widely, depending in part on the reaction temperature, but generally will be within the range of about 1 minute to about 24 hours, preferably about 5 minutes to about 8 hours. The pressure should be sufficient to maintain the dihalo aromatic sulfone and the organic amide substantially in the liquid phase.

After the second step of the reaction has proceeded for the desired time, the reaction mixture is cooled. The mixture can be cooled slowly by discontinuation of the heating, or alternately, more rapidly by introduction of a coolant through internal or external coils. In a preferred embodiment a quench fluid is added to the reaction mixture after the heating is discontinued. Water, N-methyl-2-pyrrolidone or mixtures thereof can be added during a time period which is shorter than the second step reaction time. For example, liquid NMP in an amount equivalent to about $\frac{1}{8}$ to $\frac{1}{4}$ of the total NMP used in the two-step reaction process is added to the reaction mixture over a five minute period after the heat is discontinued. The reaction mixture is allowed to cool further before the polymeric solids are recovered. Use of a quench fluid improves the recovery of polymeric solids in that particles easily recovered by filtration are formed.

The poly(arylene sulfide sulfone) polymers produced by the inventive process can be separated from the reaction mixture by conventional procedures such as by filtration, followed by washing the recovered solids with water, or by dilution of the reaction mixture with N-methyl-2-pyrrolidone and/or water followed by filtration and water washing of the recovered solids.

The poly(arylene sulfide sulfone) polymers recovered are characterized by having a polymer melt temperature in excess of about 250° C., preferably in excess of about 275° C., and even more preferably in excess of about 290° C., an inherent viscosity greater than about 0.20 dL/g, preferably greater than about 0.30 dL/g, and even more preferably from about 0.30 to about 0.60 dL/g, and a measurable melt flow rate of less than about 5000 g/10 minutes, preferably less than about 1000 g/10 minutes, and even more preferred less than about 100 g/10 minutes.

Optionally, treatment of the dried polymeric solids with a aqueous solution containing from about 1 to about 10 grams zinc acetate per liter for about 0.5 to about 2 hours to about 150° to about 200° C. can yield treated-polymeric solids having an improved melt stability.

Melt stability of a polymeric solid can be characterized as the ratio of the melt flow rates measured after 5 and 15 minutes holding time of the molten polymeric solids in the barrel of the apparatus described in ASTM D 1238, condition 317/5.0. A melt stable polymeric solid demonstrates only a small difference in the two measured melt flow rates. Therefore, the ratio of the two melt flow rates does not vary appreciably from 1, preferably in the range from about 0.80 to about 1.2. Unless otherwise noted herein, melt flow rates are measured using a 5 minute hold time and reported in units of grams/10 minutes in accordance with ASTM D 1238, condition 317/5.0.

The poly(arylene sulfide sulfone) polymers produced by the inventive process can be blended with fillers, pigments, extenders, other polymers, and the like. They can be the continuous matrix in fiber reinforced compositions such as prepregs, laminates and pultruded shapes. They can be cured through crosslinking and/or chain extension to provide cured products having thermal stability and good chemical resistance. They are useful in the production of coatings, film, molded objects and fibers. The polymers exhibit improved properties, especially the melting temperature and the glass transition temperature.

Polymer melt temperature, PMT, is expressed in degrees Celsius, and is determined by observing where the polymeric solids melt on a temperature gradient bar. The glass transition temperature, Tg, is measured using Perkin-Elmer Differential Scanning Calorimeter, Model DSC-2C. The inherent viscosity of the polymeric solids is measured at 30° C. using a solvent either a 3:2 mixture (by weight) or phenol:1,1,2,2-tetrachloroethane or N-methyl-2-pyrrolidone at a solids concentration of 0.5 grams per 100 mL. The units of inherent viscosity (I.V.) are deciliters per gram, dL/g.

A rapid chemical resistance evaluation of the polymeric solids was made by preparation of a film by compression molding. A film weighing about 0.5 grams was placed in toluene at 110° C. for 30 minutes. The film was removed dried at 150° C. under vacuum, and weighed. The appearance of the film surface was noted. The film was flexed by hand. No change in brittleness indicates good chemical resistance.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of our invention, and not limitative of the reasonable and suitable scope thereof.

Examples 1–5

A typical reaction procedure is illustrated by the runs summarized in the Table 1. In each of the runs a two-gallon autoclave-type stirred pressure reactor was charged with varying amounts of Bisphenol A (Aldrich Chemical Co., Milwaukee, WI or Eastman Chemical, Rochester, NY), 160 grams 50 weight percent sodium hydroxide solution, 1148 grams bis(4-chlorophenyl)sulfone, 82 grams anhydrous sodium acetate, and 2000 mL N-methyl-2-pyrrolidone (GAF). This mixture was heated to 177° C. and maintained at this temperature for three hours.

After cooling the mixture to about 49°–66° C. sodium hydroxide pellets and hydrogen sulfide were added in amounts such that the sodium hydroxide was present in about a 2 mole percent excess over the hydrogen sulfide, which was in slight excess as compared to moles of dihalo aromatic compounds present. The resulting mixture was heated to about 204° C. After two hours at an autogenous pressure in the range 70–100 psig, the mixture was cooled rapidly with a jacket coolant.

The initial material recovered was a yellow-brownish to dark brown soapy semi-solid. After washing four times with hot deionized water and drying overnight in a vacuum oven at about 93° C., polymeric solids having the characteristics described in the Table I were recovered.

Example 1 outside the scope of the invention yielded a polymer of low inherent viscosity. The polymer was soluble in chloroform.

Examples 2, 3, 4, and 5 are within the scope of the invention. The physical properties listed in Table I for the polymers of Examples 2 and 3 indicate that an improved polymer is obtained as compared to Example 1. No physical property data are available for Examples 4 and 5.

TABLE 1

Summary of Polymerization Reactions

| | Example | | | | |
|---|---|---|---|---|---|
| | 1 | 2 | 3 | 4 | 5 |
| Materials Added, Moles | | | | | |
| Step 1: | | | | | |
| 1. Bisphenol A | 1 | 0.25 | 0.5 | 0.5 | 0.5 |
| 2. Sodium Hydroxide Solution | 2 | 0.5 | 1 | 1 | 1 |
| 3. Bis(4-Chlorophenyl) Sulfone | 4 | 4 | 4 | 4 | 4 |
| 4. Sodium Acetate | 0.9 | 0.9 | 0.9 | 0.9 | 0.9 |
| Step 2: | | | | | |
| 1. Sodium Hydroxide Pellets | 6.3 | 7.7 | 7.12 | 7.38 | 7.12 |
| 2. Hydrogen Sulfide | 3.09 | 3.76 | 3.55 | 3.54 | 3.56 |
| 3. Water | 0 | 0 | 0 | 5 | 5 |
| Polymer | | | | | |
| Recovered Grams | 941.4 | 1017 | 1007.9 | 1077.6 | 1062 |
| $Tg^1$, °C. | 162 | 202 | 198 | — | — |
| $PMT^2$, °C. | 200 | 241 | 231 | — | — |
| Inherent Viscosity$^3$, dL/g | 0.145 | 0.246 | 0.168 | — | — |
| Melt Flow Rate$^4$, g/10 min. | — | 382 | 18 @ 265° C. 37.5 @ 277° C. | — | — |

$^1$Tg = glass transition temperature determined by differential thermal analysis
$^2$PMT determined by placing the polymer on a heated bar with a temperature gradient.
$^3$Inherent Viscosity measured at 30° C. in a 3:2 mixture, by weight, phenol:1,1,2,2-tetrachloroethane with a polymer concentration of 0.5 grams per 100 mL of solution.
$^4$ASTM D 1238

Based on inherent viscosity in Examples 1, 3 and 2 as a measure of molecular weight, increasing the mole ratio of dihalo aromatic sulfone to aromatic diphenol increases the apparent molecular weight. The polymer melting temperatures and Tg also increase with increasing this mole ratio.

Example 6

Into a 1 liter stainless steel autoclave 0.5 moles bis(4-chlorophenyl)sulfone (143.59 grams), 0.5 moles sodium carbonate (53.0 grams), 2.0 moles N-methyl-2-pyrrolidone (198.26 grams), and 0.05 moles Bisphenol A (11.41 grams) were introduced. The autoclave was closed and purged with nitrogen simultaneously with heating and stirring at 600 rpm. The temperature was increased to 175° C. and held for 3 hours. The autoclave was cooled to room temperature and subjected to a vacuum of approximately 25 inches of mercury. Subsequently, the reactants of the second step were introduced: 0.5 moles sodium acetate (41.02 grams), 0.45 moles sodium hydrosulfide (42.11 grams), 2.0 moles N-methyl-2-pyrrolidone, and 2.50 moles water (45.04 grams). The autoclave temperature was increased to 200° C. and maintained at that temperature for 3 hours. The autoclave was then cooled to room temperature and opened to remove a brown colored slurry. The slurry was filtered and then washed with hot deionized water and refiltered. This washing operation was repeated 6 times. The solid product was dried at 100° C. under vacuum.

The dried product was characterized as having large particle size, a PMT of 280° C. and an I.V. of 0.19. A total of 122.7 grams of dried polymeric solids was recovered. Elemental analysis: 59.98 weight percent carbon, 3.5 weight percent hydrogen, 21.75 weight percent sulfur and 14.11 weight percent oxygen. In addition to the dried product recovered above, 14.0 grams of fine solids, which were decanted away from the large particles, were collected on filter paper.

Example 7

Into a 1 liter stainless steel autoclave was charged 0.45 moles sodium hydrosulfide, 0.5 moles sodium acetate, 4.0 moles N-methyl-2-pyrrolidone, 0.5 moles bis(4-chlorophenyl)sulfone, 2.50 moles water, 0.5 moles sodium carbonate and 0.05 moles Bisphenol A. The reactor was purged with nitrogen and stirred at 600 rpm while heating up to a temperature of 200° C. Temperature was maintained for 3 hours. The maximum pressure reached during this period was 240 psi. The reactor was cooled. A light brown solid was removed and was washed with hot deionized water and filtered. This washing process was repeated 6 times. The product was characterized as being small particle size. The product was dried at 100° C. under vacuum. A total of 131.44 grams of polymeric solid was recovered. The solid had a PMT of 200° C.

Example 7 is a one-step polymerization reaction containing the identical ingredients as Example 6 which was conducted in the preferred two-step polymerization process. The difference in the PMT of 80° C. distinguishes the two polymeric solids of Examples 6 and 7 from one another.

Examples 8–16

Examples 8 to 16 were conducted following the procedure described in Example 6 with variations in the alkali metal base, in the mole ratio of the dihalo aromatic to aromatic diphenol and in the mole percent of excess monomer relative to the moles of sulfur source. The reaction temperature in the first step was increased from 175° C. to 200° C. The results are summarized in Table II, which also includes examples 6 and 7 for convenience of comparison.

TABLE II
CHARACTERIZATION OF PRODUCTS FROM TWO-STEP POLYMERIZATION OF BISPHENOL A WITH BIS(4-CHLOROPHENYL)SULFONE

| | EXAMPLE | | | | | | | | | | |
|---|---|---|---|---|---|---|---|---|---|---|---|
| | 6 | 7 | 8 | 9 | 10 | 11 | 12 | 13 | 14 | 15 | 16 |
| Materials Added, Moles | | | | | | | | | | | |
| Step 1: | | | | | | | | | | | |
| 1. Bisphenol A (BP-A) | 0.05 | 0.05 | 0.05 | 0.05 | 0.05 | 0.05 | 0.05 | 0.0375 | 0.0375 | 0.0375 | 0.113 |
| 2. Sodium Carbonate | 0.5 | 0.5 | 0.5 | 0.5 | 0.5 | 0.5 | 0.5 | 0.375 | 0.375 | 0.375 | 0.750 |
| 3. Bis(4-chlorophenyl) Sulfone (BCPS) | 0.5 | 0.5 | 0.5 | 0.5 | 0.5 | 0.5 | 0.5 | 0.375 | 0.375 | 0.375 | 0.375 |
| 4. N—Methylpyrrolidone | 2.0 | 4.0 | 2.0 | 2.0 | 2.0 | 2.0 | 2.0 | 1.5 | 1.5 | 1.5 | 1.5 |
| Step 2: | | | | | | | | | | | |
| 1. Sodium Acetate | 0.50 | 0.50 | 0.50 | 0.50 | 0.50 | 0.50 | 0.50 | 0.375 | 0.375 | 0.375 | 0.375 |
| 2. Sodium Hydrosulfide | 0.45 | 0.45 | 0.45 | 0.45 | 0.445 | 0.441 | 0.454 | 0.341 | 0.344 | 0.341 | 0.265 |
| 3. Water | 2.5 | 2.5 | 3.80 | 3.30 | 3.80 | 3.80 | 3.28 | 2.46 | 2.45 | 6.61 | 2.80 |
| 4. N—Methylpyrrolidone | 2.0 | 1-step RXN | 2.0 | 2.0 | 2.0 | 2.0 | 2.0 | 1.5 | 1.5 | 1.5 | 1.5 |
| Quench Fluid, mL NMP | — | — | — | — | — | — | — | 100 | 100 | 100 | 100 |
| Polymeric Solid | | | | | | | | | | | |
| Recovered, grams | 122.7 | 131.4 | 126.9 | 131.0 | 116.8 | 123.0 | 125.1 | 94.8 | 96.0 | 92.4 | 109.5 |
| Yield, Percent | 91.7 | 98.2 | 94.8 | 97.9 | 87.3 | 91.9 | 93.5 | 94.4 | 95.6 | 92.0 | 95.1 |
| PMT, °C. | 280 | 200 | 320 | — | 305 | 300 | 310 | 310 | Cures | 275 | 165 |
| I.V., dL/g | 0.19 | — | 0.35 | 0.35 | 0.29 | 0.21 | 0.41 | 0.41 | 0.57 | 0.28 | 0.12 |
| Melt Flow Rate, g/10 min | — | — | 3.2 | 20.8 | 77.2 | 576 | 6.3 | 3.2 | 0 @ 346° C. | 80.7 | — |
| Mole Ratio BCPS/BP-A | 10 | 10 | 10 | 10 | 10 | 10 | 10 | 10 | 10 | 10 | 3.32 |
| Mole % Excess Monomers | 0 | 0 | 0 | 0 | 1.0 | 2.1 | −1.0 | −1.0 | −2.0 | −1.0 | −1.1 |

The polymeric solids recovered in the exemplary two-step polymerization process have a higher PMT than those recovered from a one-step polymerization process, Example 7.

Example 8 is one of four equivalent polymerizations in which only the moles of added water was varied. Table III summarizes the results. The apparent molecular weight as indicated by the inherent viscosity increased with increasing amounts of water added.

TABLE III
VARIATION IN AMOUNT OF ADDED WATER

| | Example | | | |
|---|---|---|---|---|
| | 8 | 8a | 8b | 8c |
| Water added in Step 2, moles | 3.80 | 3.78 | 3.0 | 2.5 |
| Recovered Polymeric | | | | |
| Solid, grams | 126.9 | 123.9 | 121.6 | 122.1 |
| Yield, % | 94.8 | 92.5 | 90.8 | 91.2 |
| PMT, °C. | 320 | 305 | 300 | 300 |
| Melt Flow Rate, g/10 min | 3.2 | 15 | 59 | 92 |
| I.V., dL/g | 0.35 | 0.36 | 0.33 | 0.26 |

With reference to Table II the influence on polymer properties of a deficiency or excess of monomers, i.e. moles bis(4-chlorophenyl) sulfone minus moles aromatic diphenol, relative to the moles of sulfur source in the two-step polymerization are illustrated by Examples 9–14. The amount of monomers, rounded off to the nearest 0.1 mole percent, varied from an excess of about 2.1 mole percent (Example 11) to a deficiency of about 2.0 mole percent (Example 14). In Examples 13 and 14 a quench fluid was used. About 100 mL NMP was added to the autoclave at the end of the second step of the polymerization. Examples 12 and 13 compare the characteristics of the polymeric solids obtained without and with the quench step. Polymeric solids having PMT in excess of 300° C. and melt flow rate less that 100 g./10 min were obtained when the monomers/sulfur source mole ratio varied from a deficiency of 1 mole percent to an excess of 1 mole percent. An excess of monomers reduced the inherent viscosity of the polymeric solids, Examples 9, 10 and 11, and a deficiency increased their inherent viscosity, Examples 9, 12, 13 and 14. The material having the lowest inherent viscosity had the highest melt flow rate, Example 11, and that having the highest inherent viscosity failed to flow in the melt flow apparatus at 346° C. and appeared to cure at 326° C. on a heated bar to a non-melting solid.

A two-fold increase in the amount of added water appeared to lower PMT and inherent viscosity and to increase the melt flow rate, Run 15 vs. Run 13.

When the nature of the oligomers formed in the first step are altered by decreasing the bis(4-chlorophenyl) sulfone to aromatic diphenol mole ratio to a value below that of the lower limit of the preferred range (Run 16), the final polymeric solids had a PMT of less than 200° C. The relatively low molecular weight (I.V. 0.12) of the recovered solids may be responsible for the low PMT observed. $^{13}$C-NMR of the final polymeric solids from Run 16 indicated the presence of monomeric sequences of —(BCPS)BPA(BCPS)BPA(BCPS)—. Therefore, oligomers containing more than one mole of Bisphenol A per two moles of the bis(-chlorophenyl) sulfone appear to be formed in the first step. By adjustment of the stoichiometry of the second step, it may be possible to increase the PMT to the desired range.

Ninety grams of the dried polymeric solids of Example 12, 0.9 g zinc acetate and 300 mL water were charged to a 1-liter stainless steel autoclave. The mixture was heated for 30 minutes at 185° C. with stirring. The recovered solids were large chunks and appeared to have been melted. After grinding in a Wiley mill, the zinc-treated polymeric solids gave a melt flow rate of 8.2 g/10 min.

Example 16A

In a one-liter stainless steel autoclave a mixture of 0.375 moles bis(4-chlorophenyl) sulfone, 0.750 moles sodium carbonate containing 0.1875 moles water, 0.0375 moles Bisphenol A (aromatic diphenol), 1.5 moles N-methyl-2-pyrrolidone, was purged with nitrogen, stirred at 600 rpm and heated to 200° C. After 3 hours the mixture was cooled to about 50° C. Using vacuum transfer the following materials were added to the reaction mixture: 0.341 moles sodium hydrosulfide containing 0.70 moles water, 0.375 moles sodium acetate, 2.83 moles water, 1.5 moles N-methyl-2-pyrrolidone. The contents of the autoclave were heated to 200° C. After 3 hours 100 mL N-methyl-2-pyrrolidone were added over a five minute period to the polymerization mixture. The mixture was cooled. The recovered solids were washed with hot distilled water and filtered. This washing procedure was repeated five times. The recovered solids were dried at about 150° C. under vacuum to yield 90.7 grams of a solid having, PMT 305° C., melt flow rate 4.5 g/10 min., inherent viscosity 0.45 dL/g, and Tg 217° C. Forty grams of the recovered solids were treated with 0.4 grams zinc acetate and 400 mL $H_2O$ for 0.5 hours at 150° C., filtered, and dried at 150° C. under vacuum. The melt flow rates at 5 minutes and 15 minutes hold time at 317° C. were 4.0 and 5.4 g/10 minutes, respectively. The $^{13}$C-NMR spectrum was consistent with a random copolymer having a Bisphenol A incorporation of about 11.5 weight percent.

Examples 17–40

In these examples a variety of aromatic diphenols (Table IV) were substituted individually for Bisphenol A in the two-step polymerization process with quench.

solids from these three examples gave the lowest PMT's of 250, 255 and 250° C., respectively, and the lowest inherent viscosity and Tg values. Additional material characterized as fine solids in amounts of from about 3 to 14 percent based on the theoretical yield was recovered.

A portion of the solids recovered in Example 19 was treated with an aqueous zinc acetate solution. Forty grams of the solids, 4.0 grams zinc acetate and 400 mL water were heated in a 1-liter autoclave for 30 minutes at 170° C. The treated solids were filtered and dried at 150° C. under vacuum. Their measured melt flow rate was 13.4 g/10 minutes.

That which is claimed is:

1. A process comprising:
   (a) reacting in an organic solvent a dihalo aromatic sulfone with an aromatic diphenol at a mole ratio of about 8/1 to about 20/1 in the presence of an alkali metal base to form a mixture comprising dihalo-terminated oligomers, and subsequently
   (b) adding a sulfur source selected from the group consisting of hydrogen sulfide, alkali metal hydrosulfides, alkali metal sulfides, acyclic and cyclic thioamides and mixtures, thereof, to the mixture resulting from (a) and continuing the reaction at a temperature and for a sufficient time to form a recoverable polymeric solid, characterized as having a polymer melt temperature in excess of 250° C.

TABLE IV

CHARACTERISTICS OF PRODUCTS OBTAINED WITH VARIOUS AROMATIC DIPHENOLS

| Example | Aromatic Diphenol | Recovered Solids, g | PMT, °C. | Melt Flow Rate, g/10 Min | I.V., dL/g | Tg, °C. |
|---|---|---|---|---|---|---|
| 17 | Biphenol (No excess) | 93.4 | 270 | 68.3 | 0.30 | |
| 18 | Biphenol | 88.8 | 280 | 35.3 | 0.34 | |
| 19 | Biphenol (1.0% deficient) | 91.4 | 310 | 13.2 | 0.39 | |
| 20 | Bisphenol T | 89.4 | 305 | 34.9 | 0.33 | 209 |
| 21 | Bisphenol T (quench 90/10 NMP/$H_2O$) | 93.4 | 290 | | 0.32 | |
| 22 | Bisphenol S | 35.9 | 250 | | 0.14 | 202 |
| 23 | Bisphenol S (quench 90/10 NMP/$H_2O$) | 64.4 | 255 | | 0.21 | 207 |
| 24 | Hydroquinone (quench 90/10 NMP/$H_2O$) | 91.3 | 300 | | 0.38 | 223 |
| 25 | Hydroquinone | 89.1 | 300 | | 0.40 | |
| 26 | Phenylhydroquinone (quench 90/10 NMP/$H_2O$) | 91.6 | 310 | 13.2 @ 343° C. | 0.35 | 223 |
| 27 | Phenylhydroquinone | 91.0 | 290 | | 0.35 | |
| 28 | bis(p-Hydroxyphenyl)methane | 92.9 | 300 | 6.2 | 0.35 | 215 |
| 29 | 1,5-Dihydroxynaphthalene | 88.8 | 300 | | 0.32 | 223 |
| 30 | 1,5-Dihydroxynaphthalene (Purified) | 86.4 | 280 | | 0.28 | |
| 31 | 1,5-Dihydroxynaphthalene (Sublimed) | 85.0 | 280 | | 0.34 | |
| 32 | 1,6-Dihydroxynaphthalene | 86.9 | 280 | | 0.19 | 172 |
| 33 | 2,2-bis(p-Hydroxyphenyl)-1,1,1,3,3,3-hexafluoropropane (HFBPA) | 88.6 | 290 | 44.1 | 0.31 | 211 |
| 34 | HFBPA | 94.7 | 265 | | 0.26 | |
| 35 | HFBPA (quench 90/10 NMP/$H_2O$) | 95.3 | 285 | 44.8 | 0.27 | |
| 36 | HFBPA (quench 80/20 NMP/$H_2O$) | 97.0 | 290 | | 0.29 | |
| 37 | HFBPA (no excess) | 89.9 | 260 | | 0.27 | |
| 38 | HFBPA (2% deficient) | 97.3 | 270 | 7.1 | 0.36 | |
| 39 | HFBPA (2.9% deficient) | 95.0 | 280 | 13.0 | 0.37 | |
| 40 | 2,4-Dihydroxybenzophenone | 67.8 | 250 | | 0.15 | 190 |

The quantity of each ingredient in terms of moles was identical to that described in Example 16A with minor variations described herewith. In Runs 17 and 18 2.12 and 2.11 moles water, in Runs 21 and 23–28 2.62 moles water and in Run 22 2.81 moles water were used. The mole percent monomers was 1 percent deficient compared to sulfur source except as noted in Runs 17, 19, 37, 38 and 39. In the second step the quench fluid was 100 mL NMP except as noted in Runs 21, 23, 24, 26, 35 and 36. The yield of recovered polymeric solids was in excess of 85% for eight of the ten aromatic diphenols. Bisphenol S, examples 22 and 23, gave yields of about 35 and 64 percent, respectively, and 2,4-dihydroxybenzophenone, example 40, gave a yield of about 68%. The 2. The process of claim 1 wherein (b) further an alkali metal carboxylate is added, said alkali metal carboxylate being represented by R'COOM, where R' is a hydrocarbyl radical selected from the group consisting of alkyl, cycloalkyl, aryl and combinations thereof with carbon atoms in the range of 1 to about 20 and M is an alkali metal.

3. The process of claim 2 wherein R' is an alkyl radical having 1 to about 6 carbon atoms or a phenyl radical and M is sodium.

4. The process of claim 2 wherein (b) further water is added to bring the total water, including water of hydration, present to an amount of at least about 3.5 moles per mole of sulfur source and greater than about 0.5 moles per mole organic solvent.

5. The process of claim 2 wherein (b) N-methyl-2-pyrrolidone and water are added in amounts such that the ratio: (moles total water including water of hydration)/(total moles NMP) is within the range from about 0.75 to about 2.5.

6. The process of claim 5 wherein the ratio is within the range from about 1 to about 2.

7. The process of claim 1 wherein the aromatic diphenol is characterized by having an alkylene radical link between two phenolic groups and the dihalo aromatic sulfone is a bis(halophenyl)sulfone.

8. The process of claim 7 wherein the aromatic diphenol is 2,2-bis(p-hydroxyphenyl)propane and the bis(halophenyl)sulfone is bis(p-chlorophenyl)sulfone.

9. The process of claim 1 wherein the alkali metal base is selected from the group consisting of an alkali metal hydroxide and an alkali metal carbonate.

10. The process of claim 9 wherein the alkali metal base is an alkali metal carbonate.

11. The process of claim 10 wherein the alkali metal carbonate is sodium carbonate.

12. The process of claim 1 wherein the dihalo-terminated oligomers are characterized as dihalo-terminated polyethersulfone oligomers.

13. The process of claim 12 wherein the dihalo-terminated polyethersulfone oligomers comprise the oligomer from the reaction of one mole of aromatic diphenol with two moles of a bis(halophenyl) sulfone.

14. The process of claim 7 wherein the alkali metal hydrosulfide is sodium hydrosulfide.

15. The process of claim 7 wherein (a) the alkali metal base to the aromatic diphenol mole ratio is within the range of about 2/1 to 25/1 and wherein (b) the ratio of the moles of bis(halophenyl)sulfone minus the moles of aromatic diphenol in (a) to moles of added sulfur source is within the range of about 1.05/1 to about 0.95/1, the mole ratio of alkali metal base to sulfur source is within the range of about 1.1/1 to about 2.2/1, and the mole ratio of alkali metal carboxylate to bis(halophenyl)sulfone is within the range of about 1/1 to about 2/1.

16. The process of claim 8 wherein the recoverable polymeric solid is characterized as having a polymer melt temperature in excess of 275° C. and an inherent viscosity in excess of 0.30 dL/g measured at 30° C. using as solvent N-methyl-2-pyrrolidone at a solids concentration of 0.5 grams per 100 mL.

17. The process of claim 8 wherein the recoverable polymeric solid is characterized as having a polymer melt temperature in excess of 290° C., a measurable melt flow rate of less than 5000 grams per 10 minutes and an inherent viscosity from about 0.30 to about 0.60 dL/g measured at 30° C. using as solvent N-methyl-2-pyrrolidone at a solids concentration of 0.5 grams per 100 mL.

18. The process of claim 1 wherein further an organic amide is present as a solvent in (a) and (b).

19. The process of claim 18 wherein the organic amide is selected from the group consisting of formamide, acetamide, N,N-dimethylformamide, N,N-dimethylacetamide, N-methyl-2-pyrrolidone, and epsilon-caprolactam, dimethylbenzamide and mixtures thereof.

20. The process of claim 19 wherein the organic amide is N-methyl-2-pyrrolidone.

21. The process of claim 1 wherein (a) and (b) are conducted in the presence of a solvent selected from among the group consisting of dimethylsulfoxide, sulfolane, 1,3-dimethyl-2-imidazolidinone and tetramethylurea.

22. The process of claim 1 wherein (a) and (b) are conducted in the presence of a solvent mixture comprising an organic amide selected from the group consisting of formamide, acetamide, N,N-dimethylformamide, N,N-dimethylacetamide, N-methyl-2-pyrrolidone, and epsilon-caprolactam, dimethylbenzamide and mixtures thereof and a compound selected from the group consisting of dimethylsulfoxide, sulfolane, 1,3-dimethyl-2-imidazolidinone and tetramethylurea.

23. The process of claim 1 wherein further a quench fluid is added to cool the mixture from (b).

24. The process of claim 23 wherein the quench fluid is selected from the group consisting of N-methyl-2-pyrrolidone, water, or mixtures thereof.

25. A polymer produced by the process of claim 1.

26. A polymer produced by the process of claim 8.

27. A polymer produced by the process of claim 15.

* * * * *